United States Patent [19]

Yoshida

[11] Patent Number: 5,669,556

[45] Date of Patent: Sep. 23, 1997

[54] NOZZLE FOR A WELDING TORCH HAVING SPUTTER BUILD-UP REDUCING CONFIGURATION

[75] Inventor: Youichi Yoshida, Nabari, Japan

[73] Assignee: Exedy Corporation, Osaka, Japan

[21] Appl. No.: 448,952

[22] Filed: May 24, 1995

[30] Foreign Application Priority Data

| Jul. 6, 1994 | [JP] | Japan | 6-155008 |
| Jul. 6, 1994 | [JP] | Japan | 6-155009 |
| Jul. 6, 1994 | [JP] | Japan | 6-155010 |
| Jul. 6, 1994 | [JP] | Japan | 6-155011 |
| Sep. 2, 1994 | [JP] | Japan | 6-210295 |
| Sep. 2, 1994 | [JP] | Japan | 6-210296 |

[51] Int. Cl.$^6$ .................. B05B 1/24; B05B 1/28
[52] U.S. Cl. .............. 239/83; 239/105; 239/290
[58] Field of Search .................. 239/79, 83, 84, 239/105, 290

[56] References Cited

U.S. PATENT DOCUMENTS 2,102,395 12/1937 Valentine et al. ............ 239/84
3,698,646 10/1972 Robba et al. ............ 239/591
4,579,282 4/1986 Navara et al. ............ 239/83

FOREIGN PATENT DOCUMENTS

| 248203 | 9/1962 | Australia | 239/84 |
| 2 154 842 | 7/1972 | Germany . | |
| 59-20968 | 2/1984 | Japan . | |
| 2-28380 | 2/1990 | Japan . | |
| 5-169269 | 7/1993 | Japan . | |

*Primary Examiner*—Lesley D. Morris
*Attorney, Agent, or Firm*—Shinjyu Office of Patent Attorneys

[57] ABSTRACT

A nozzle 22 is used for a torch 5 which effects arc welding in a shield gas atmosphere using welding wire 26 that is continuously supplied from a wire support 23 that extends in one direction. The nozzle main body is disposed around and is separated by a space from the wire support 23. Air blow adapters 24 are fixed to the outer side of the nozzle main body and serve to supply into the nozzle main body fluid for removing sputter, and they have air introduction passages 33 that are directed to the central tip end.

25 Claims, 7 Drawing Sheets

NOZZLE FOR A WELDING TORCH HAVING SPUTTER BUILD-UP REDUCING CONFIGURATION

BACKGROUND OF THE INVENTION

A) Field of the Invention

The present invention relates to a nozzle for a torch. More particularly, the invention relates to a nozzle for the torch of a gas-shielded arc welding machine that effects arc welding of vehicle parts in a shield gas atmosphere with easily replaceable components.

B) Description of the Related Art

Gas-shielded arc welding devices for effecting arc welding metallic parts in an atmosphere of a shield gas such as an inert gas or carbon dioxide, etc., are well known. One such device includes a torch having a metal welding wire filler material which is supplied from a support structure within one end of a nozzle, the nozzle further including an air passage for blowing out shield gas. In a typical gas-shielded arc welding process using a torch as described above, there is little or no occurrence of oxidation or nitridation of molten metal, since the arc and molten metal in the welding section are enveloped by an inert gas. Also, as there is no solvent there is no occurrence of rusting caused by a solvent.

One nozzle for gas-shielded arc welding disclosed in Japanese Laid-open Utility Model Application No. 59-20968 is provided with a support which supports metal welding wire filler material, a cylindrical nozzle for blowing shield gas around the support, a shield gas supply section which supplies shield gas into the space between the support and the nozzle, and a gas supply section which supplies into this space a gas for removing sputter. No oxidation or nitridation of the molten metal occurs during welding, since shield gas supplied from the shield gas supply section comes out from the space between the nozzle and the filler metal support and envelops the arc and molten metal. Further, in this nozzle for gas-shielded arc welding, the gas supply section includes two air supply pipes that are fixed to the nozzle by a means not disclosed and extend into the nozzle. The two air supply pipes are disposed symmetrically off center with respect to a circular air passage, and air supplied from the two air supply pipes swirls around the support and blows off adhering sputter. However, it is not possible for sputter adhering to the various parts of the nozzle to be blown off properly by the swirling air produced by this conventional structure. When the mount of sputter adhering increases, the shield gas blow-out quantity falls, and as a result, welding faults (oxidation and nitridation, etc.) occur. In a short time, therefore, it is necessary to stop the welding machine and clean the various parts manually.

With such a structure, since the air supply pipes are integrally fixed to the nozzle, which is a consumable, each time the nozzle is replaced, the air supply pipes too have to be scrapped.

In another welding machine disclosed in Japanese Laid-open Patent Application No. 5-169269, the torch includes a covering element for water cooling provided around a filler metal support in order to reduce adhesion of sputter to the torch tip end. Further, an air supply section of the of the torch makes it possible to supply air for removal of sputter from the torch tip end. In this conventional torch, it is difficult for sputter to adhere to the torch tip end, since molten sputter is immediately solidified, as the result of the cooling action of the covering element provided around the filler metal support. Also, even if sputter does adhere to the torch tip end, it can be removed by supplying air for sputter removal to the torch tip end. However, with this arrangement, the structure of the torch tip end is complex, since it is necessary to provide a jacket through which cooling water is passed.

The torch of a gas-shielded arc welding machine described in the disclosure of Japanese Laid-open Utility Model Application No. 2-28380 has, as main elements, a support which supplies metal welding wire filler material and a cylindrical nozzle unit which is so installed that it defines an annular space around the support. The filler metal support is fixed to the front end of a coil liner and, inside, it has a support hole which supports welding wire that is supplied from the coil liner. A hole that is larger than the welding wire diameter is formed in the coil liner. Further, the filler metal support has a hole which provides communication between the coil liner's hole and the annular space. Shield gas or high-pressure air for sputter removal is supplied from the coil liner's hole, and goes through the annular space to be jetted from the torch tip end. Shield gas is used at the time of welding and it envelops the arc and molten metal so preventing oxidation and nitridation of the molten metal. High-pressure air is used after the end of welding, and when it passes through the annular space, it blows off sputter that has adhered to various parts. As a result, reduction, caused by adhesion of sputter, of the amount of shield gas blown out is prevented.

With this torch, since air for sputter removal is supplied into a passage via the same discharge hole as the shield gas, its flow rate is insufficient. Also, with this torch, air is liable to remain in the annular space between the nozzle portion and the filler metal support after blow-out of high-pressure air for removal of sputter. When, in this state, shield gas is sprayed at the time of the next welding operation, residual air is pushed out from the tip end of the nozzle portion, and consequently oxidation and nitridation, etc. are liable to occur and cause an increase in welding faults.

In a torch for gas-shielded arc welding, the sputter removal effects can be expected to vary depending on the timing of spraying of high-pressure air for sputter removal. Examples of different timings are as follows. Air is blown out immediately after completion of welding, or air is blown out when, following completion of welding, a set time has elapsed and cooling of sputter has progressed. Other alternatives include blow-out of air each time welding is effected, and blow-out of air after welding has been effected plural times and sputter has built up to a certain degree. With this torch, the timing for spraying of high-pressure air for sputter removal is fixed, and it is therefore not possible for operatives to set the optimum timing in accordance with conditions.

Generally, a filler metal support is constituted by a tip element which is fixed to the front end of a long-extending coil liner that leads from a wire supply section and by a cylindrical insulating element between the base portion of the tip element and the base portion of a cylindrical nozzle. The tip element has a hole through which welding wire is passed. The insulating element is for the purpose of insulating the cylindrical nozzle main body from the tip element, which functions as a welding electrode. The insulating element is in screw attachment to the tip element and is also in screw attachment to the cylindrical nozzle. The torch may also be provided with a shield gas supply section that supplies shield gas into the space between the tip element and the cylindrical nozzle and with a gas supply section which supplies into this space gas for sputter removal. In this case, the gas supply section includes an air-blow pipe which is connected around the nozzle, in order to increase the flow rate of the supplied gas and thereby improve the sputter removal effects. Also, the coil liner is bent in a set location, so as to permit the torch tip end to be displaced in a narrow space by robot operation.

With this welding machine torch, when the cylindrical nozzle is screwed into the insulating element, which has been screwed beforehand into the tip element, the air-blow pipe that extends as a gas supply section from the cylindrical nozzle may interfere with the bent coil liner. If the air-blow pipe is located in a position in which it does not interfere, the result is that the cylindrical nozzle and insulating element may not be properly connected.

SUMMARY OF THE INVENTION

It is one object of the present invention to effect satisfactory reduction of the adhesion of sputter to various parts.

It is another object of the invention to effect satisfactory blow-off of sputter that has adhered to various parts, and thereby increase the continuous operation time of a welding machine.

A still further object of the invention is to reduce the amount of sputter adhering to various parts by means of a simple structure.

A still further object of the invention is to make the arrangement such that air for removal of sputter is not liable to come out at the time of welding.

A still further object of the invention is to make it possible for the timing of blow-out of air for the removal of sputter to be set by operatives in accordance with conditions in a gas-shielded arc welding machine.

A still further object of the invention is to ensure proper fixing of an insulating element and a cylindrical nozzle and to prevent interference between a fluid passage section and other parts in a welding machine that includes a fluid passage section fixed outside a nozzle.

The torch nozzle according to one aspect of the invention is used for the torch of a gas-shielded arc welding machine which effects arc welding of vehicle parts in a shield gas atmosphere using filler metal in wire form that is continuously supplied from a filler metal support that extends in one direction. This torch nozzle includes a cylindrical nozzle main body which is disposed around and is spaced apart from the filler metal support thus defining an annular passage therebetween, and a fluid passage section that is fixed to the nozzle main body and has fluid passages directed towards the central tip end via the annular passage.

With this torch nozzle, after completion of welding, a fluid for the removal of sputter is supplied into the nozzle main body from the fluid passage section and blows off the sputter that has adhered to various parts at the time of welding. In this case, the flow rate of the fluid is large, since it is supplied from outside the nozzle main body. Further, since the fluid passages are directed towards the central tip end, the fluid advances in a straight line, without revolving round the interior of the nozzle main body. As a result, thorough removal of sputter adhering to various parts is effected.

The torch according to another aspect of the invention is the torch of a gas-shielded arc welding machine which effects arc welding of vehicle parts in a shield gas atmosphere using continuously supplied filler metal in wire form. This torch includes a tip element, a cylindrical insulating element and a shield gas passage section. The tip element possesses a hole for the purpose of passing through and supporting filler metal, and it extends in one direction. The cylindrical insulating element is fixed to the base portion of a filler metal support. The nozzle possesses a cylindrical nozzle main body which is so installed that it lies around and is spaced apart from the filler metal support defining an annular passage therebetween, and a fluid passage section which is fixed to the outside of the nozzle main body and has fluid passages that are directed towards the filler metal support via the annular passage. The shield gas passage section is for the purpose of supplying shield gas into the interior of the nozzle main body.

With this torch, after completion of welding, fluid for sputter removal is supplied into the interior of the nozzle main body from the fluid passages of the fluid passage section. Since the fluid passages are directed towards the insulating element, proper removal of sputter adhering to the insulating element is effected in a short time.

The torch according to another aspect of the invention is the torch of a gas-shielded arc welding machine which effects arc welding of vehicle parts in a shield gas atmosphere using continuously supplied filler metal in wire form. This torch includes a filler metal support, a nozzle and a shield gas supply section. The filler metal support possesses a hole for passing through and supporting filler metal, and extends in one direction. The nozzle possesses a cylindrical nozzle main body that is disposed around and is spaced apart from the filler metal support thus defining an annular passage therebetween, and a fluid passage section that is fixed to the outside of the nozzle main body and possesses fluid passages that are in fluid communication with the annular passage thus able to direct fluid towards the filler metal support. The shield gas supply section is for the purpose of supplying shield gas into the interior of the nozzle main body.

With this torch, after completion of welding, fluid for the removal of sputter is supplied into the interior of the nozzle main body from the fluid passages of the fluid passage section. Since the fluid passages are directed towards the filler metal support, proper removal of sputter adhering to the filler metal support is effected in a short time.

The torch according to a still further aspect of the invention is the torch of a gas-shielded arc welding machine which effects arc welding of vehicle parts in a shield gas atmosphere using continuously supplied filler metal in wire form. This torch comprises a filler metal support, a cylindrical nozzle and a shield gas supply section. The filler metal support possesses a hole for passing through and supporting filler metal, and it extends in one direction. The cylindrical nozzle is disposed around and is spaced apart from the filler metal support thus defining an annular passage therebetween. A fluid passage section communicates with the interior of the nozzle and is in fluid communication with the annular passage. A shield gas supply section is provided for supplying shield gas into the interior of the nozzle main body after welding and removal of sputter.

With this torch, at the time of welding, filler metal supported by the filler metal support is continuously supplied, and, together with this, shield gas is supplied by the shield gas supply section to between the filler metal support and the nozzle main body. As a result, welding is effected with the arc and molten metal in the welding section enveloped by shield gas. During welding, molten metal becomes sputter and is scattered and adheres to the filler metal support and the cylindrical nozzle main body. After completion of welding, fluid is supplied from the fluid supply section into the interior of the nozzle and blows off the sputter. After completion of sputter removal, shield gas is supplied into the interior of the nozzle by the shield gas supply section, and fluid remaining in the nozzle is driven out by this shield gas. As a result, sputter removal fluid is not liable to come out from the torch at the time of the next welding operation. In particular, since the shield gas supply section supplies shield gas via the outside of the nozzle main body, the shield gas flow rate can be made large, and so proper drive-out of residual air is effected in a short time.

The torch according to a still further aspect of the invention is the torch of a gas-shielded arc welding machine which effects arc welding of vehicle parts in a shield gas atmosphere using continuously supplied filler metal in wire form. This torch includes a filler metal support, a cylindrical nozzle and a shield gas supply section. The filler metal support is formed with an axially extending aperture for supplying and supporting filler metal. A cylindrical nozzle is disposed around and is spaced apart from the filler metal support thus defining an annular passage therebetween. A shield gas supply section is for the purpose of supplying shield gas into the interior of the nozzle. A fluid supply section supplies fluid for sputter removal at a flow rate of ≧3000 liters/minute into the nozzle and the annular passage.

With this torch, after completion of welding, fluid is supplied into the nozzle by the fluid supply section and blows off sputter. Since, in this case, the fluid is supplied at a flow rate of ≧3000 liters/minute, sputter is thoroughly removed. As a result, even if the above described welding and sputter removal operations are effected in succession to one another, continuous operation for 3 hours or more is possible.

The torch according to a still further aspect of the invention is the torch of a gas-shielded arc welding machine which effects arc welding of vehicle parts in a shield gas atmosphere using continuously supplied filler metal in wire form. This torch includes a filler metal support, a nozzle, a fixing element and a shield gas supply section. The filler metal support has a tip element that has a hole for supplying and supporting filler metal and extends in one direction and a cylindrical insulating element that is fixed to the base portion of the filler metal support. The nozzle is disposed around and is separated by a space from the tip element and it has a cylindrical nozzle main body which is contacted by the outer peripheral surface of the front end of the insulating element and a fluid passage section that is fixed to the outside of the nozzle main body. The fixing element fixes the insulating element and the nozzle main body. The shield gas supply section is for the purpose of supplying shield gas into the nozzle main body.

With this torch, at the time of assembly, the tip element is fixed to the filler metal support (eg, to the front end of a coil liner). Next, the cylindrical insulating element is fixed to the tip element in a manner such that rotation is not possible. In this state, the inner peripheral surface of the cylindrical nozzle element contacts the outer peripheral surface of the cylindrical insulating element. At this time, if it seems that a fluid supply pipe could interfere with the coil liner, etc., all that needs to be done is to avoid interference between the two by rotating the cylindrical nozzle element through a set angle. When the elements are in this state, the nozzle element and the insulating element are fixed by the fixing element. In this manner, the nozzle element and the insulating element are properly fixed and, in addition, interference between the fluid supply pipe and other elements is prevented.

A gas-shielded arc welding machine according to another aspect of the invention is a gas-shielded arc welding machine which effects arc welding of vehicle parts in a shield gas atmosphere using continuously supplied filler metal in wire form. This welding machine comprises a torch and a timing alteration means. The torch comprises a filler metal support and a nozzle. The filler metal support includes a hole for supplying and supporting filler metal, and extends in one direction. The nozzle possesses a cylindrical nozzle main body which lies around and is separated by a space from the filler metal support and a fluid supply section which is for the purpose of supplying fluid for sputter removal into the nozzle main body. The timing alteration means makes it possible to alter the timing of supply by the fluid supply section.

With this arc welding machine, the timing of supply of the sputter removal fluid can be altered by the timing alteration means, and it is therefore possible to effect thorough removal of sputter under a variety of differing conditions.

The torch according to a still further aspect of the invention is the torch of a gas-shielded arc welding machine which effects arc welding of vehicle parts in a shield gas atmosphere using continuously supplied filler metal in wire form, and includes a filler metal support, a cylindrical nozzle, a shield gas supply section and a fluid passage section. The filler metal support possesses a hole for passing through and supporting filler metal, and extends in one direction. The cylindrical nozzle is disposed around and is spaced apart from the filler metal support thus defining an annular passage therebetween. The shield gas supply section is for the purpose of supplying shield gas into the interior of the nozzle. The fluid passage section is provided separately from the shield gas supply section, and it communicates with the interior of the nozzle and the annular passage.

With this torch, at the time of welding, filler metal supported by the filler metal support is continuously supplied, and, together with this, shield gas is supplied into the interior of the nozzle by the shield gas supply section. As a result, welding is effected with the arc and molten metal in the welding section enveloped by the shield gas. During welding, the molten metal becomes sputter and is scattered and adheres to the filler metal support and the cylindrical nozzle. After completion of welding, fluid is supplied into the interior of the nozzle from the fluid passage section and blows off the sputter. Since this fluid passage section is provided separately from the shield gas supply section, the amount of fluid supplied is large, and as a result sputter adhering to different parts is thoroughly removed.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

Table 1, which is found at the end of the specification, includes test data showing the relationship between the flow rate and sputter removal effects of the first embodiment of the present invention.

FIRST EMBODIMENT OF THE PRESENT INVENTION

Figure 1:
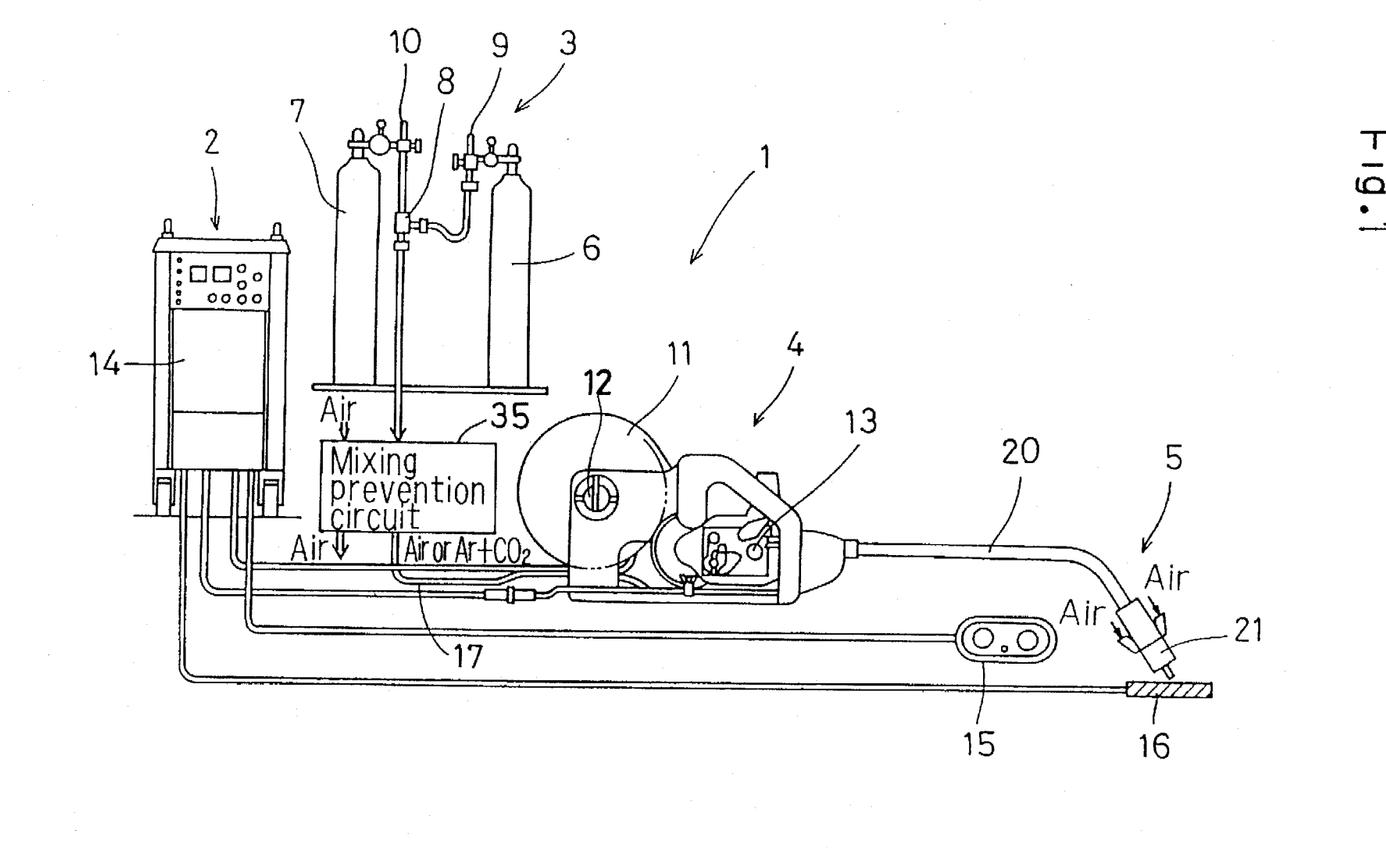
FIG. 1 is a side view of an inert gas shield arc welding machine having a torch in accordance with a first embodiment of the present invention.

In FIG. 1, an inert gas shield welding machine 1 which is used with a first embodiment of the present invention includes a variety of main elements such as, a welding power supply 2, a gas supply unit 3, a wire supply unit 4 and a torch 5. The welding machine 1 is used in the manufacture of vehicle parts.

The welding power supply 2 serves to produce DC welding current from, for instance, a 3-phase 200 volt alternating current power supply, and it is provided with a control section 14 (described below). Also, the welding power supply 2 is connected to an earth or electrode 16.

The gas supply unit 3 includes, for instance, an argon gas cylinder 6 that is filled with high-pressure argon gas, a carbon dioxide cylinder 7 that is filled with high-pressure carbon dioxide, and a mixing chamber 8 in which argon gas and carbon dioxide are mixed to form a shield gas used during welding using the various embodiments of the present invention. An argon gas flow rate regulator 9 is provided between the argon gas cylinder 6 and the mixing chamber 8, and a carbon dioxide flow rate regulator 10 is provided between the carbon dioxide cylinder 7 and the mixing chamber 8. A mixing prevention circuit 35 is connected to the mixing chamber 8 via a pipe or a rubber hose.

The mixing prevention circuit 35 is also connected to a pressurized air source, not shown, which is, for example, a high-pressure compressor which produces approximately 1 MPa compressed air. The mixing prevention circuit 35 controls air that is supplied from the air source and shield gas supplied from the gas supply unit 3. The mixing prevention circuit 35 prevents mixing of the air and shield gas. The mixing prevention circuit 35 is connected to the torch 5 by a rubber hose 17 in a manner which is described in greater detail below.

The wire supply unit 4 includes a wire reel mounting portion 12 for mounting a wire reel 11 on which welding wire 26 is wound, and a feed roller 13 for supplying into the torch 5 welding wire 26 that is wound on the wire reel 11. The feed roller 13 supplies welding wire 26 to the torch 5 at a set speed in correspondence to the welding speed.

The torch 5 has a coil liner 20 for passing the welding wire 26 through and a torch portion 21 that is mounted at the front end of the coil liner 20. The above noted rubber hose 17 from the mixing prevention circuit 35 is connected to the base end of the coil liner 20.

Figure 2:
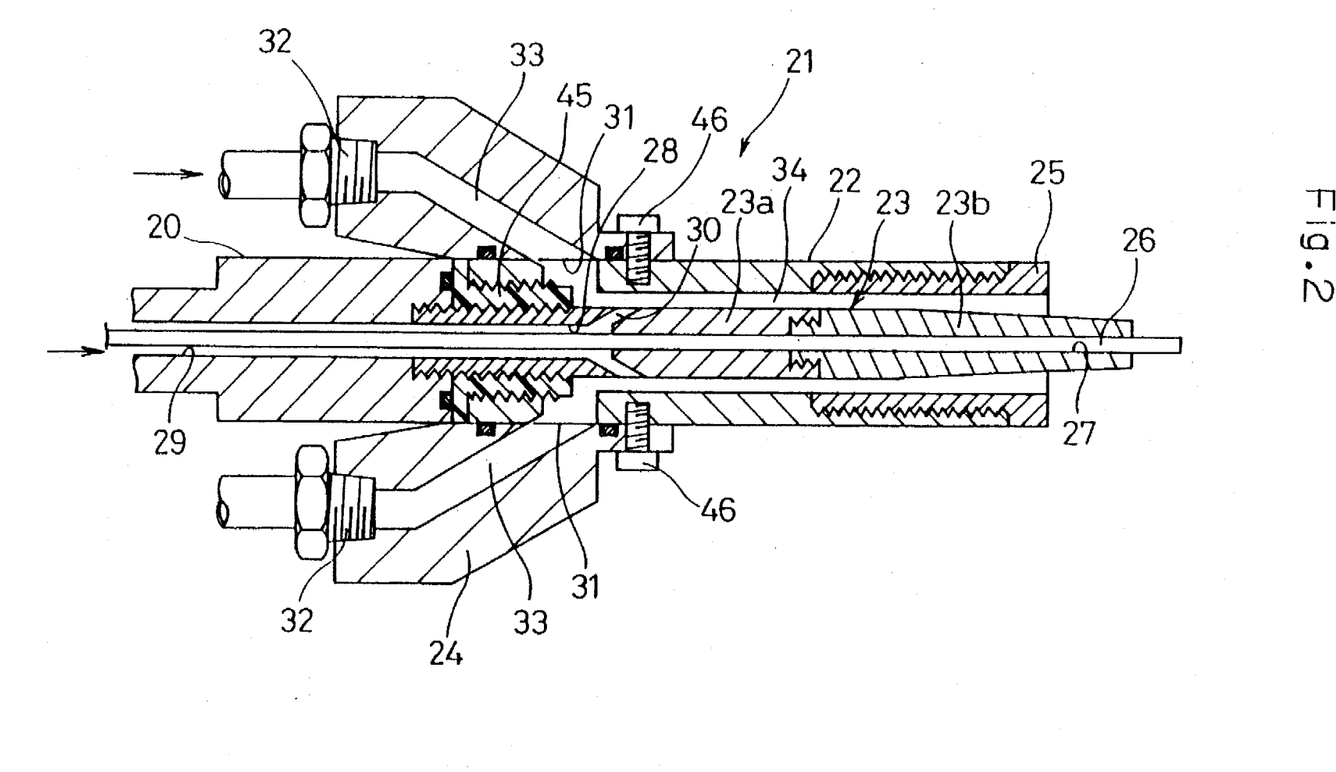
FIG. 2 is a fragmentary cross-section of the torch used with the inert gas shield arc welding machine depicted in FIG. 1.

As shown in FIG. 2, the torch portion 21 has, as main elements, a cylindrical nozzle 22, which is made of oxygen-free copper, and a wire support 23, which is in screw attachment to the front end of the coil liner 20 and is installed inside and concentrically with the nozzle 22.

A cylindrical covering element 25 which has a collar and is made of carbon is screwed into the front-end opening of the nozzle 22. The covering element 25 is so installed that it covers the inner peripheral surface of the nozzle 22 from its front end to a set location in its interior.

The wire support 23 is installed on the inner periphery side of the nozzle 22, and an annular passage 34 is defined between it and the nozzle 22. The wire support 23 consists of a tip body 23a that is screwed into the coil liner 20, and a contact tip 23b that is screwed into the front end of the tip body 23a. The front end of the contact tip 23b extends beyond the front end of the nozzle 22. The wire support 23 has formed in its center a wire hole 27 which has approximately the same diameter as the wire, extends in the direction of the length of the torch and is for the purpose of passing the welding wire 26 through. The wire hole 27 supports the welding wire 26 in a manner permitting free movement in the axial direction. The wire support 23 is electrically connected to the welding power supply 2, and functions as a welding electrode. A hole 28 with a diameter larger than that of the wire hole 27 is formed inside the tip body 23a of the wire support 23. The hole 28 communicates with a hole 29 in the coil liner 20. At the front end of the hole 28, there are formed eight (8) communication holes 30 which communicate with the annular passage 34 defined by the outer peripheral surface of the wire support 23 and the inner peripheral surface of the nozzle 22.

An insulating bush 45 made of insulating resin is screwed onto the outer periphery of the base end of the wire support 23. The base portion of the nozzle 22 is screwed onto the outer periphery of the insulating bushing 45, and two air introduction holes 31 which go right through in the radial direction and are directed towards the insulating bush 45 are formed in the nozzle 22.

Air blower adapters 24 made of aluminum are provided in an opposed disposition at two locations of the outer periphery at the bottom of the nozzle 22. The air blower adapters 24 are fixed by bolts 46 to the outer periphery of the main body portion of the nozzle 22. The provision of air blower adapters 24 in two locations increases the rate of flow of the supply from the air blower adapters 24. The air blower adapters 24 have air supply ports 32 formed at their ends, and inside them there are formed air introduction passages 33 which provide communication between air introduction ports 31 and the air supply ports 32. The diameter of the air introduction passages 33 is larger than that of the hole 28 of the tip body 23a. The air introduction passages 33 are directed towards the center and are inclined towards the front end. The air supply ports 32 are connected via rubber hoses (not shown) to the mixing prevention circuit 35. The air blower adapters 24 here are detachably mountable on the nozzle 22, and they can be detached when the nozzle 22, which is a consumable part, is replaced. Consequently, there is no unnecessary waste such as in the past of parts for supplying air from the exterior.

Figure 3:
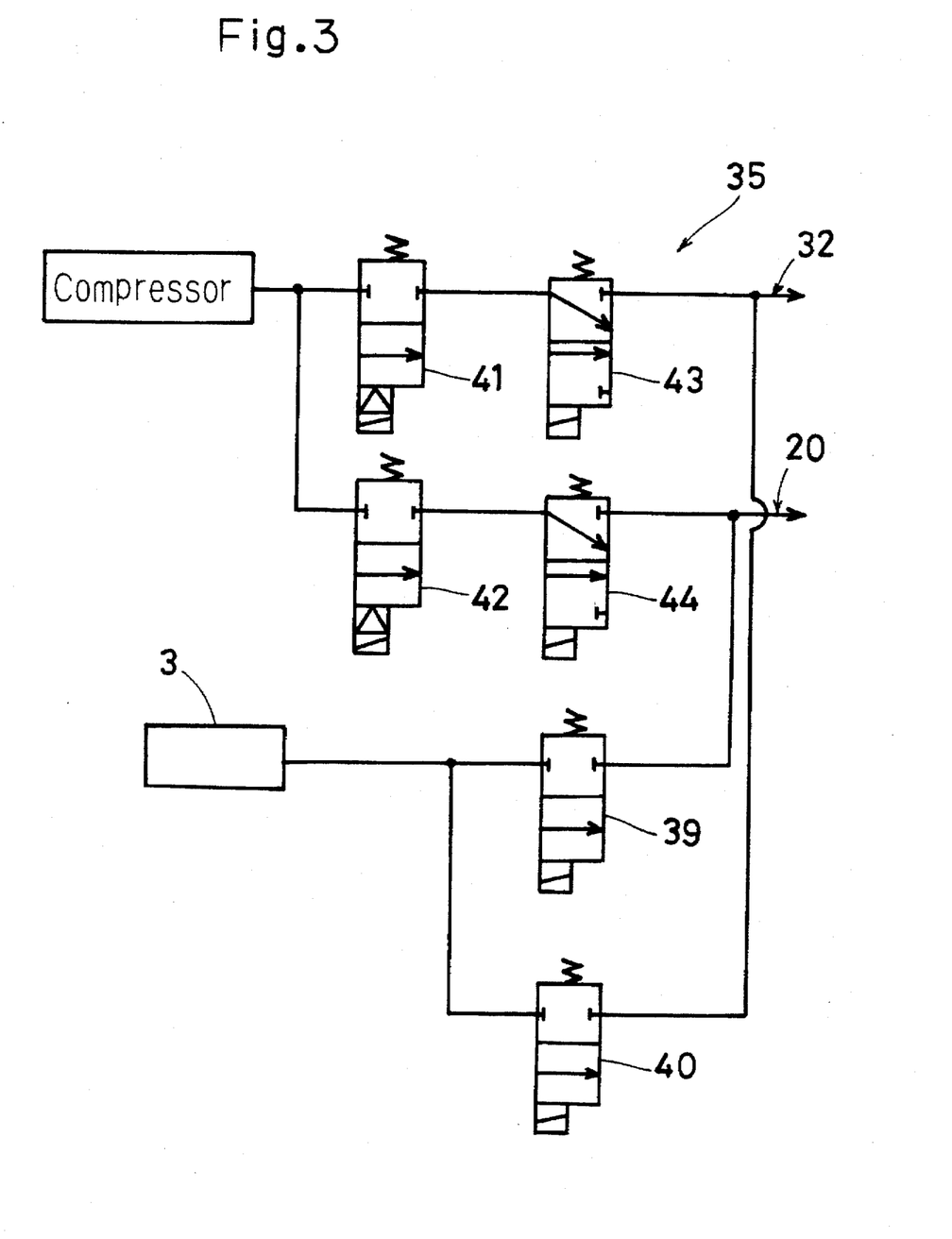
FIG. 3 is a circuit diagram of a mixed gas prevention circuit employed in the inert gas shield arc welding machine depicted in FIG. 1.

The mixing prevention circuit 35 is a circuit which is designed to prevent admixture of air in the shield gas at the time of welding. As shown in FIG. 3, the mixing prevention circuit 35 possesses shield gas switch valves 39 and 40 which switch on and switch off shield gas supplied from the gas supply source 3, air switch valves 41 and 42 which each switch on and switch off air supplied from the air source, arid mixing prevention valves 43 and 44 which are respectively connected to the air switch valves 41 and 42. The shield gas switch valves 39 and 40 are, eg, direct drive type two-port valves, while the air switch valves 41 and 42 are, eg, pilot type two-port piston drive valves. The mixing prevention valves 43 and 44 are, eg, three-port popper type valves. The shield gas switch valve 39 and mixing prevention valve 44 are connected via the rubber hose 17 to an air connection port (not shown) of the coil liner 20. The shield gas switch valve 40 and mixing prevention valve 43 are connected by rubber hoses to the air supply ports 32 of the air blow adapters 24.

Figure 4:
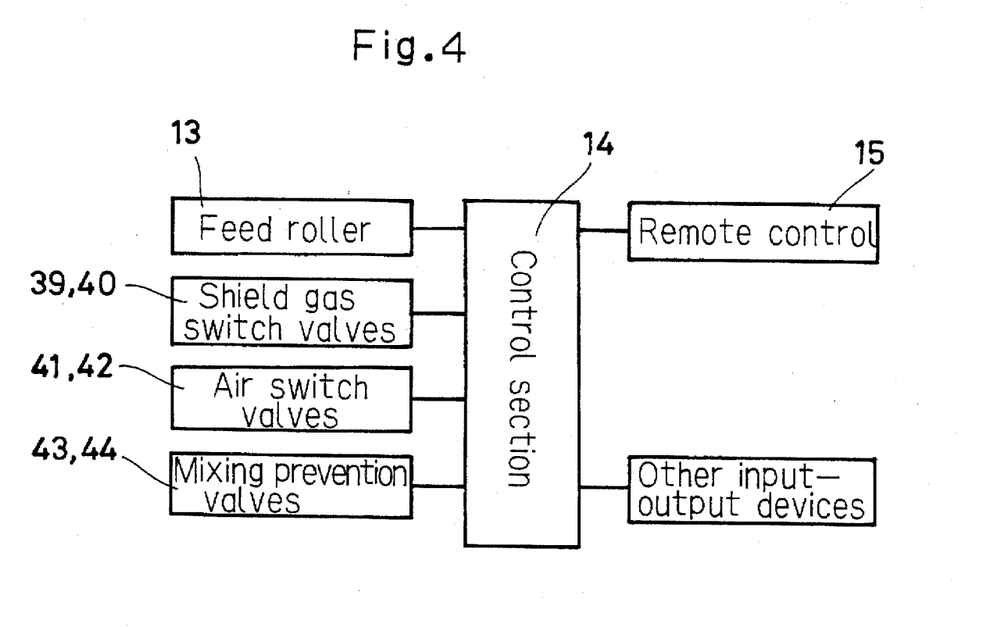
FIG. 4 is a block diagram showing the control configuration of the inert gas shield arc welding machine depicted in FIG. 1.

As is shown in FIG. 4, the control section 14 includes a microcomputer which includes a CPU, a ROM and a RAM, etc. The control section 14 is connected to a remote control 15, the feed roll 13, the shield gas switch valves 39 and 40, the air switch valves 41 and 42, the mixing prevention valves 43 and 44 and other input-output devices. With this configuration, an operator can easily alter various operational settings via the remote control 15. For example, the welding time for each operation, the timing and duration of spraying of air for blowing away sputter after completion of welding and the timing and duration of blow-out of pre-flow gas, etc. can be set to optimum values in accordance with working and ambient conditions and specific usages.

Next, the operation in the above example of practice will be described. In this example, sputter removal is effected each time one welding operation is completed. Specifically, 1 cycle is welding (shield gas blow) →sputter removal (high-pressure air blow) →residual air drive-out (shield gas blow).

At the time of welding, the air switch valves 41 and 42 are brought to a closed state, and the mixing prevention valves 43 and 44 are brought to a discharge state. Then, the shield gas switch valve 40 is brought to an opened state, and shield gas is supplied to the air supply ports 32 of the air blow adapters 24. The shield gas enters into the nozzle 22 via the air introduction ports 31 and moves to the front end via the annular passage 34. As a result, shield gas supplied from the gas supply unit 3 is blown out from the tip end of the torch portion 21. This isolates molten material from air during the welding operation.

The mixing prevention valves 43 and 44 are both in a discharge state during welding. Even if leakage of air from the air switch valves 41 and 42 occurs, the leaked air is exhausted by the leakage prevention valves 43 and 44. Consequently, air is not supplied to the torch 5 during welding. If sputter is produced during the welding, some of it tries to adhere to the front end of the nozzle 22, but it is difficult for the sputter that has been produced to adhere, since the covering element 25 made of carbon is provided at the front end of the inner periphery of the nozzle 22.

On completion of welding, after a wait for a set time for, eg, the work to move away from the torch 5, the air switch valve 41 is brought to an opened state and the mixing prevention valve 43 is brought to an opened state. The shield gas switch valve 40 is brought to a cut-off state. As a result, high-pressure air from the air source is supplied to the air supply ports 32 of the air blow adapters 24. The flow rate of the air supplied to the air supply ports 32 at this time is 4500 liters/minute, while the flow rate of air that is supplied to the hole 29 is 3000 liters/minute. In total, therefore, air is supplied at a flow rate of 7500 liters/minute. This air blows off sputter that has adhered to various parts. The air supplied to the air supply ports 32 goes via the air introduction ports 31 in the side surface of the nozzle 22 to be supplied into the annular passage 34 on the inner periphery side of the nozzle 22. The air supplied into the annular passage 34 blows off sputter that has adhered to the covering element 25. The supplies of air move in a straight line towards the tip end, without revolving inside the space 34, and so sputter adhering to the parts that define the space 34 is blown off properly. Since, further, the air cools the various parts of the torch 5, it is difficult for sputter that is produced at the time of the next welding operation to adhere to the various parts. The air at this time also contributes to cooling of the work. It is desirable that the temperature of the various parts be about 100° C. or less. If it is 60° C., the amount of sputter adhesion is greatly reduced. In continuous operation in the present embodiment, the number of times operations up to when the temperature of the nozzle 22 tip end reaches 60° C., is greater than it is conventionally. That is, it is made more difficult for the tip-end temperature to reach 60° C. Also, the temperature does not reach 100° C. even on execution of 100 successive operations.

The sputter removal effects are improved, since the air blow adapters 24 supply sputter removal air from locations that are different from those of supply by the communication holes 30 of the tip body 23a. In particular, since the air blow adapters 24 are mounted externally on the nozzle 22, the hole diameter is large and the flow rate becomes large, and sputter adhering to various parts can therefore be removed properly in a short time. Also, since the flow rate is large, cooling of the various parts is promoted and it becomes more difficult for sputter to adhere.

Further, air is blown directly onto the shoulder portion of the insulating bush 45, since the air introduction ports 31 are directed towards the insulating bush 45 shoulder portion. Since the insulating bush 45 is a portion on which sputter is liable to adhere, the blow-off of sputter as the result of air directly striking this portion gives excellent effects, in that it improves the durability of the insulating bush 45 and prevents build-up of sputter.

When this torch 5 is used, adhesion of sputter is prevented by a simple arrangement, which is, the covering element 25 made of carbon is provided at the front end and high-pressure air is supplied. As a result, the weight of the torch nozzle 5 can be reduced and, if operations are automated, the volume of the automated equipment can be made small. Further, since the covering element 25 made of carbon is detachably fitted by being screwed in, if the performance deteriorates because of adhesion of sputter, the element can be replaced, making it possible to achieve sputter removal effects for an extended period of time. Also, the occurrence of blowholes due to admixture of air is prevented, since admixture of air in the shield gas during welding is prevented.

When, on elapse of a set time (2 minutes), the sputter blow-off is ended, the shield gas switch valve 40 is brought to an opened state, the air switch valve 41 is brought to a cut-off state, and the mixing prevention valve 43 is brought to a cut-off state. As a result, shield gas is supplied to the air supply ports 32. The shield gas drives air remaining in the air introduction passages 33 and the annular passage 34 out to the front end of the torch 5 and produces a shield gas atmosphere in the annular passage 34. Consequently, there is no blow-out of residual air from the torch tip end at the time of the next welding operation. Since pre-flow shield gas is supplied from the air blow adapters 24 that are externally mounted on the nozzle 22, its flow rate is large, and so residual air can be driven out properly in a short time (3 minutes).

Since the sputter removal effects are improved by various arrangements in this example of practice, there is no need to stop the welding machine at set intervals and remove sputter by hand as has been done in the past.

EXAMPLES OF PRACTICE OF THE FIRST EMBODIMENT

Tests were conducted on the relations between sputter removal effects and the flow rate of air for sputter removal, as indicated in Table 1. The torches used in these tests had generally the same structure as that in the example of practice described above. Table 1 is given below, at the end of the specification.

Example 1

Air blow adapters were not provided, and sputter removal air was supplied only from tip body holes. Holes were provided in 4 places, and the diameter was 2 mm. Air was supplied for 2 minutes at a flow rate of 1498 liters/minute. On elapse of 2 hours, sputter had accumulated and the amount of inert gas blown out was insufficient.

Example 2

Holes were formed in eight (8) places, and the flow rate became 2996 liters/minute. The period of time over which sufficient inert gas came out was 3 hours.

Example 3

Eight (8) holes were provided, as in Example 2, and in addition a port for supply of air from an air blow adapter was provided at one (1) location of the nozzle exterior. The diameter of the air blow adapter's air supply port was 5 mm. The flow rate from the air blow adapter was 2340 liters/minute, giving a total flow rate of 5336 liters/minute. The period of time over which sufficient inert gas came out was 5 hours.

Example 4

(Structure corresponding to the example of practice described above)

As in the example of practice described above, holes were provided in eight (8) places and in addition ports for supply of air from air blow adapters were provided at two (2) locations of the nozzle exterior. The air blow adapter hole diameter was 5 mm. The flow rate from the air blow adapters was 4680 liters/minute, giving a total flow rate of 7676 liters/minute. The period of time over which sufficient inert gas came out was 8 hours.

Example 5

The air blow adapter hole diameter in Example 4 was made 6 mm. The flow velocity was lower than in Example 4, but the flow rate was greater, and the total flow rate was 9736 liters/minute. The period of time over which sufficient inert gas came out was 8 hours.

Example 6

The air blow adapter hole diameter in Example 5 was made 10 mm. The flow velocity was lower than in Example 5, but the flow rate was greater, and the total flow rate was 21722 liters/minute. The period of time over which sufficient inert gas came out was 8 hours.

Second Embodiment

Figure 5:
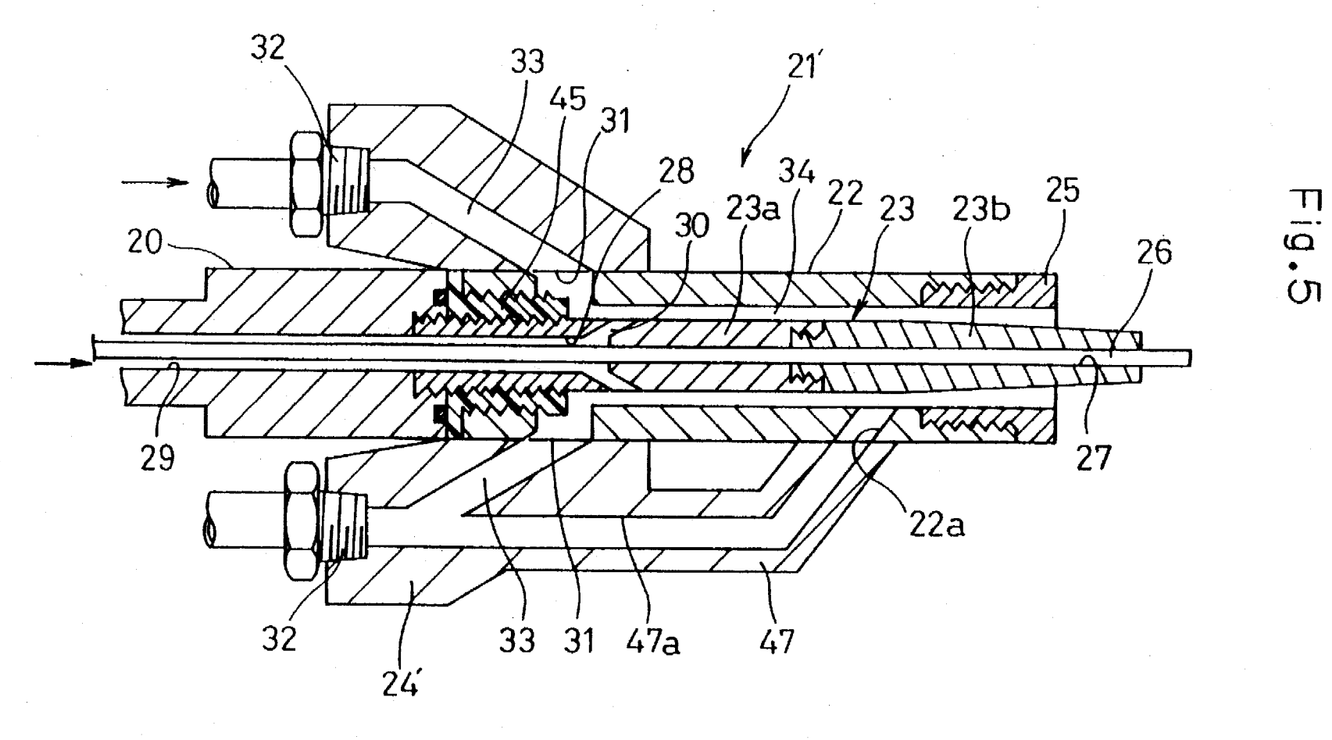
FIG. 5 is a fragmentary cross section of a torch, similar to FIG. 2, of a second embodiment of the present invention.

A second embodiment of the present invention is depicted in FIG. 5. Elements and features in the second embodiment common to the first embodiment are designated by reference numerals consistent with the first embodiment. Consequently, such common elements are not described a second time.

In the second embodiment, the torch portion 21' includes an air blow adapter 24'. The air blow adapter 24' of the arc welding machine torch 5 shown in FIG. 5 has a projection portion 47 which extends towards the front end of the torch portion 21' and in which there is a passage 47a that communicates with the air supply port 32. The front ends of the projection portions 47 are slanting, inclining towards the nozzle 22, and they are fixed to the side of the front end of the nozzle 22. Holes 22a that provide communication between the interior and the exterior are formed in the nozzle 22 in portions corresponding to the passages 47a of the projection portions 47. The holes 22a extend obliquely and are directed towards the contact tip 23b of the wire support 23.

With the above structure, when sputter is blown off following welding, a portion of the air supplied from the air supply ports 32 passes through the passages 47a and holes 22a and is blown directly on the contact tip 23b, and sputter adhering to the contact tip 23b is therefore more thoroughly removed. Further, since air is blown directly on the contact tip 23b, cooling of the contact tip 23b is more greatly promoted. Conventionally, when the diameter of the wire hole 27 becomes larger, because of the contact tip temperature becoming high, wear is liable to progress because of rubbing contact with wire 26, and so it is necessary to replace the wire support 23 when the diameter of the of the wire hole 27 becomes large. With this example of practice, however, the life of the wire support 23 is extended, since the contact tip 23b is more thoroughly cooled.

Some modifications and variations to the first and second embodiments are also contemplated by the inventors. For instance, (a) High-pressure air may be supplied into the hole 29 of the coil liner 20 in the first and second embodiments described above, and the high-pressure air may be supplied simultaneously with supply to the air supply ports 32. If this is done, the high-pressure air supplied to the hole 29 passes through the communication holes 30 and then goes via the annular passage 34 to the torch front end. In this manner, the high-pressure air supplied to the hole 29 acts to sweep out sputter in the annular passage 34 in the direction of length of the torch 5. Meanwhile, the high-pressure air supplied to the air supply ports 32 of the air blow adapters 24 strikes directly against portions where there is a large mount of sputter adhesion and pulls off the sputter from various parts. Since both pull-off of sputter and sweep-out of detached sputter take place in this manner and since, further, the flow rate becomes greater going in the direction of advance along the annular passage 34, sputter in the annular passage 34 is removed more efficiently.

(b) Although the air blow adapters 24 are detachably fixed to the nozzle 22 in the embodiments described above, the arrangement may also be that they are detachably fixed to the coil liner 20. In this case, removal and replacement of the air blow adapters 24 is easily effected.

(c) Although sputter is removed each time welding is performed in the embodiments of practice described above, the arrangement may also be that sputter is removed after welding has been performed plural times. In this case too, use of the invention makes it possible to effect a more thorough removal of sputter.

(d) Although high-pressure air was used as the gas for sputter removal, other gases such as nitrogen gas, etc. may be used.

(e) In the embodiments described above, the front end of the covering element 25 may be made round-cornered. This makes it possible to reduce adhesion of sputter still further.

(f) A powder may be admixed in the high-pressure air for removing sputter. Also, a liquid may be used instead of a gas.

(g) Although air for removal of sputter is supplied into the nozzle in the embodiments described above, the arrangement may also be that, conversely, sputter is removed by suction into the nozzle.

(h) The arrangement may also be that a passage is formed in the insulating element and sputter is removed by passing a fluid through this passage.

Third Embodiment of The Present Invention

Figure 6:
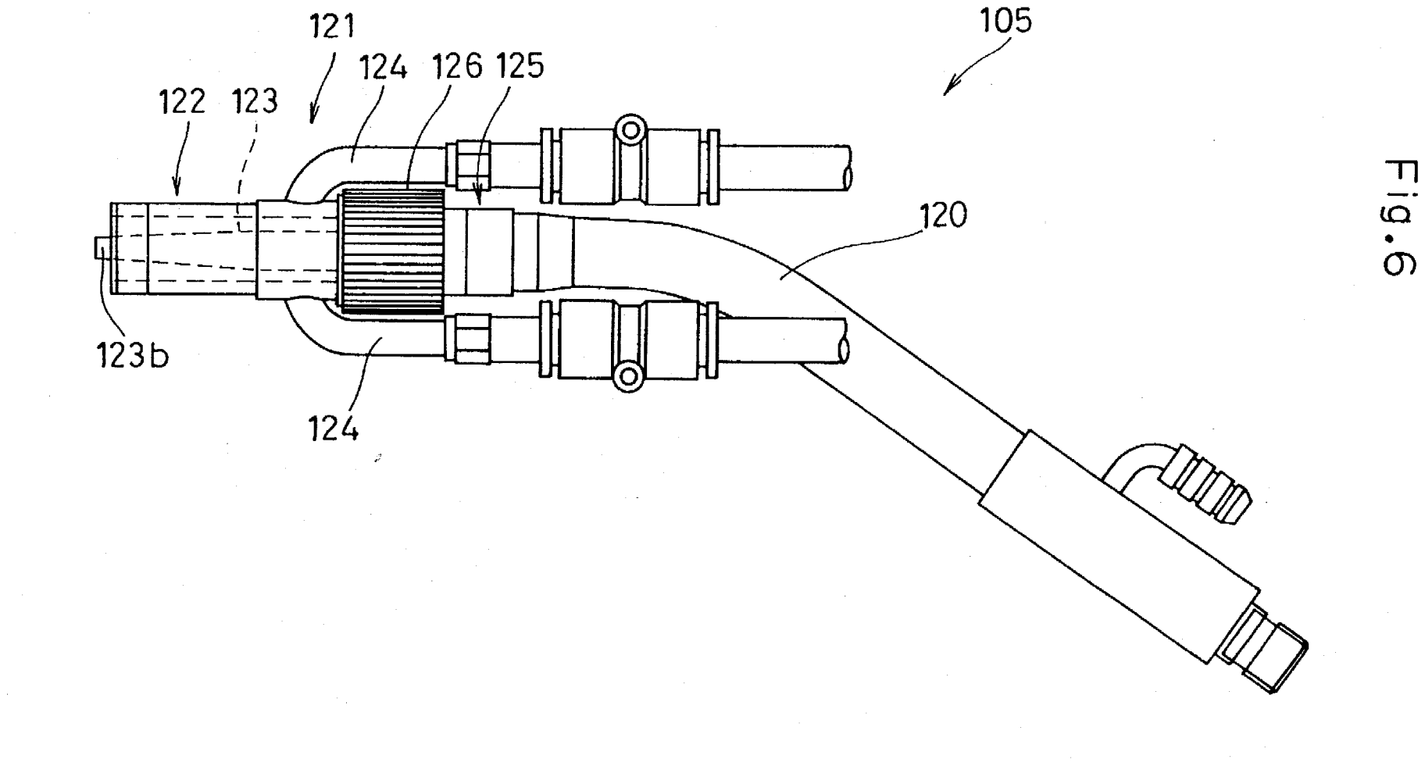
FIG. 6 is a fragmentary side view of a torch in accordance with a third embodiment of the present invention.
Figure 7:
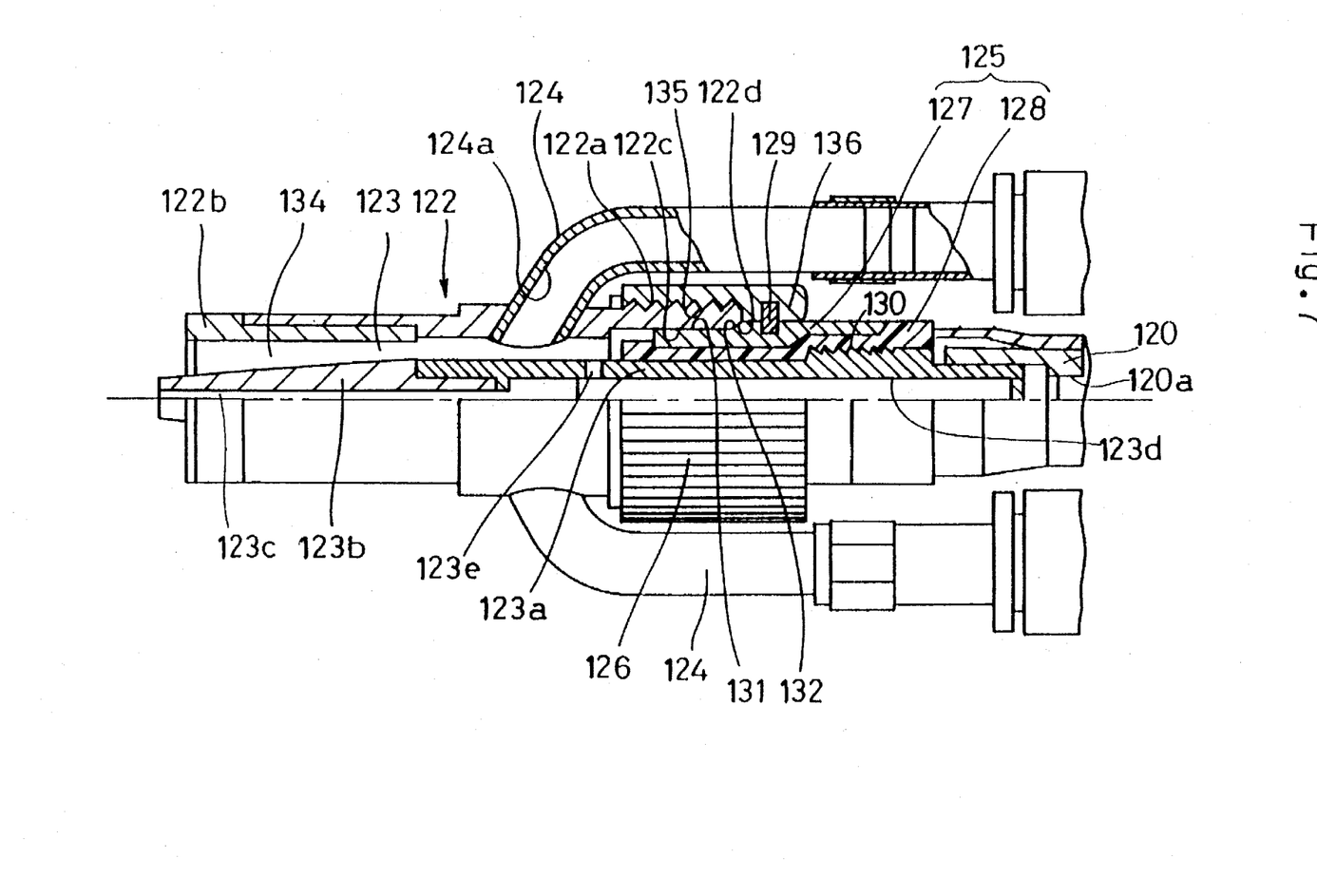
FIG. 7 is a fragmentary, part cross-section, part elevation of a portion of the torch depicted in FIG. 6.

A third embodiment of the present invention is depicted in FIGS. 6 and 7. A torch 105 shown in FIGS. 6 and 7 includes a coil liner 120 for passing welding wire through and a torch portion 121 that is mounted at the front end of the coil liner 120. A hole 120a is formed inside the coil liner 120. A rubber hose 17 from the mixing prevention circuit (see FIG. 1 and the description of the First Embodiment of the Present Invention) is connected to the base end of the coil liner 120. The front end of the coil liner 120 is bent in a predetermined location, so as to permit the torch tip end to be displaced in a narrow space by, for instance, robot operation.

As shown in FIG. 6 and FIG. 7, the torch portion 121 has, as main elements, a cylindrical nozzle 122, which is made of oxygen-free copper, a wire support 123 (tip element) that is fixed to the front end of the coil liner 120 and is located inside and concentrically with the nozzle 122, an insulating tube 125 that is located between the base portion of the nozzle 122 and the base portion of the wire support 123, and a fixing nut 126 that fixes the insulating tube 125 and nozzle 122.

Threads 122a are formed on the outer peripheral surface of the base portion of the nozzle 122, and two air blow pipes 124 are fixed to an intermediate portion of the main body. The air blow pipes 124 extend rearwardly from the nozzle 122. Air supply holes 124a are defined inside the air blow pipes 124. The diameter of the air supply holes 124a is 5 mm. The two air blow pipes 124 run together, and they are connected by rubber hoses (not shown) to the mixing prevention circuit. The inner peripheral surface of the rear portion, in the direction of length, of the nozzle main body is a tapered surface 122c which narrows going towards the front in the direction of length. The rear portion, in the direction of length, of the tapered surface 122c is made with a bevelled portion 122d which is like a portion where a corner has been cut off.

A cylindrical covering element 122b, which has a collar and is made of carbon, is screwed into the front-end opening of the nozzle 122. This covering element 122b is so installed that it covers the inner peripheral surface of the nozzle 122 from its front end to a set location in its interior.

The wire support 123 is installed on the inner periphery side of the nozzle 122, and an annular passage 134 is defined in the space between it and the nozzle 122. The wire support 123 consists of a tip body 123a that is screwed into the coil liner 120, and a contact tip 123b that is screwed into the front end of the tip body 123a. The front end of the contact tip 123b extends beyond the front end of the nozzle 122. A wire hole 123c which has approximately the same diameter as the wire and extends in the direction of the length of the torch is formed in the contact tip 123b. The wire hole 123c supports welding wire in a manner permitting free movement in the direction of torch length. This wire support 123 is electrically connected to the welding power supply, and it functions as a welding electrode. A hole 123d with a diameter larger than that of the wire hole 123c is formed inside the tip body 123a of the wire support 123. This hole 123d communicates with the hole 120a in the coil liner 120. In front of the hole 123d, there are formed in the tip body 123a eight (8) communication holes 123e which communicate with the space 134. The hole diameter of each communication hole 123e is 2 mm.

The insulating tube 125 consists mainly of a cylindrical metal member 127 made of brass, and a resin section 128 that is integrally formed on the inner side of the metal member 127.

A stop ring 129 is fixed to an intermediate portion of the outer peripheral surface of the metal member 127. The outer peripheral surface at the front end of the metal member 127 forms a tapered surface 131 which narrows going towards the front end. The rear of the tapered surface 131 is made a bevelled portion 132 which is like a portion where a corner has been cut off. The tapered surface 131 contacts the tapered surface 122c of the nozzle 122. Also, the bevelled portion 132 contacts the bevelled portion 122d of the nozzle 122.

The fixing nut 126 has threads 135 formed on the inner peripheral surface of its front portion in the direction of length. These threads 135 screw together with the threads 122a of the nozzle 122. A ring-shaped contact portion 136 that projects radially inward is formed at the rear-end portion of the fixing nut 126 in the direction of length. The stop ring 129 fixed to the insulating tube 125 is contacted from the rear, in the direction of length, by this contact portion 136. In a state in which the fixing nut 126 is fitted in the manner shown in FIG. 7, the nozzle 122 and insulating tube 125 are pressed together in the direction of length. As the result of the tapered surfaces being brought strongly into contact with one another and the bevelled portions being brought strongly into contact with one another in this manner, relative rotation between these portions is made impossible. Also, because of the firm mutual contact between the tapered surfaces and between the bevelled portions, the seal characteristic at the contact portions is improved and it is difficult for foreign matter to infiltrate. Since it is difficult for foreign matter to infiltrate, the contact portions are not liable to become scratched, and so the seal characteristic is maintained for a long time.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

TABLE 1

| | Number of holes | Diameter | Flow velocity | Flow rate | Time |
| --- | --- | --- | --- | --- | --- |
| 1 | 4 small holes | small hole 2 mm | 3 times | 1498 1/min | 2 hours |
| 2 | 8 small holes | small hole 2 mm | 3 times | 2996 1/min | 3 hours |
| 3 | 8 small holes + 1 large hole | large hole 5 mm | 2 times | 5336 1/min | 5 hours |
| 4 | 8 small holes + 2 large holes | large hole 5 mm | 2 times | 7676 1/min | 8 hours |
| 5 | 8 small holes + 2 large holes | large hole 5 mm | 1.6 times | 9736 1/min | 8 hours |
| 6 | 8 large holes + 2 small holes | large hole 6 mm | 1 time | 21722 1/min | 8 hours |

What is claimed:

1. A nozzle for a gas-shielded arc welding machine comprising:

a cylindrical nozzle main body, a filler metal support section having welding filler wire feeding means, disposed within said cylindrical nozzle main body, wherein an annular passage is defined between said filler metal support section and said cylindrical nozzle main body which extends to an open end of said cylindrical nozzle main body, and a fluid passage adaptor attached to an outer side of said nozzle main body, said fluid passage adaptor formed with a fluid passage open to said annular passage, said fluid passage intersecting said annular passage adjacent to said filler metal support section, and said fluid passage being configured to direct fluid flow directly toward said filler metal support section and through said annular passage towards said open end of said cylindrical nozzle main body.

2. A nozzle as in claim 1, further comprising a covering element made of carbon which is removably attached to a front-end inner peripheral surface of said nozzle main body.

3. A nozzle as in claim 1, wherein said fluid passage adaptor is removably mountable on said nozzle main body.

4. A nozzle as in claim 1, wherein said fluid passage intersects with said annular passage at an acute angle.

5. A nozzle as in claim 1, further comprising a cylindrical insulating element fastened to a base portion of said filler metal support section.

6. A nozzle as in claim 5, wherein said cylindrical insulating element is made of an insulating resin material.

7. A nozzle as in claim 1, further comprising:

a shield gas source and a pressurized air source, wherein said welding filler wire feeding means includes a supply hole, a portion of said supply hole being larger than a diameter of filler wire extending therethrough and said shield gas source being configured to selectively supply shield gas to said supply hole and said pressurized air source being configured to selectively supply pressurized air to said fluid passage.

8. A nozzle as in claim 7, wherein said filler metal support section is formed with at least one aperture allowing fluid communication between said supply hole and said annular passage.

9. A gas-shielded arc welding machine and nozzle for a gas-shielded arc welding machine comprising:

a gas-shielded arc welding machine having a control means, a wire feed means and a shield gas supply means;

a nozzle having a cylindrical nozzle main body disposed around a filler metal support section defining an annular space therebetween, and a fluid passage section attached to an outer side of said nozzle main body, where the filler metal support section is coupled to the wire feed means for supplying metal wire filler material;

wherein said fluid passage section is formed with a first fluid passage in fluid communication with said annular passage defined within said nozzle main body and said fluid passage section is formed with a second fluid passage in fluid communication with said annular passage within said nozzle main body forward from said first fluid passage toward a front-end of said nozzle main body and towards a front end of said filler metal support section.

10. A gas-shielded arc welding machine and nozzle as in claim 9, further comprising a removably attachable covering element made of carbon which covers a front-end inner peripheral surface of said nozzle main body.

11. A torch for a gas-shielded arc welding machine which effects arc welding in a shield gas atmosphere using continuously supplied metal wire filler welding material, the torch comprising:

a filler metal support section formed with a supply hole for directing metal wire filler welding material therethrough;

a cylindrical insulating element which is fixed to a base portion of said filler metal support section;

a nozzle having a cylindrical nozzle main body fixed to said cylindrical insulating element and configured to extend around said filler metal support section forming an annular passage between an outer surface of said filler metal support section and an inner surface of said cylindrical nozzle main body, and a shield gas supply section for supplying shield gas into said nozzle main body through said annular passage.

12. A torch for a gas-shielded arc welding machine as in claim 11, further comprising a removably attachable covering element made of carbon which covers a front-end inner peripheral surface of said nozzle main body.

13. A torch as in claim 11, wherein said cylindrical insulating element is made of an insulating resin material.

14. A torch as in claim 11, further comprising:

a pressurized air source, wherein a portion of said supply hole is larger than a diameter of said metal wire filler welding material and said shield gas supply section is configured to selectively supply shield gas to said supply hole and said pressurized air source is configured to selectively supply pressurized air to said fluid passage.

15. A torch as in claim 14, wherein said filler metal support section is formed with at least one aperture allowing fluid communication between said supply hole and said annular passage.

16. A torch for a gas-shielded arc welding machine which effects arc welding of parts in a shield gas atmosphere using continuously supplied metal wire filler material, comprising:

a filler metal support section formed with a hole that extends throughout said filler metal support section for supplying and supporting a metal wire filler material;

a cylindrical nozzle which is disposed around and spaced apart from said filler metal support section defining an annular passage therebetween;

a fluid passage adaptor attached to said cylindrical nozzle which communicates with said annular passage for supplying pressurized air to said annular passage;

a fluid supply means coupled to said fluid passage for selectively supplying pressurized air to said annular passage for removal of sputter; and a shield gas supply section coupled to said filler metal support section for selectively supplying shield gas into said nozzle during welding and after removal of sputter.

17. A torch as in claim 16, wherein said shield gas supply section is further coupled to said fluid passage adaptor.

18. A gas-shielded arc welding machine and torch which effects arc welding of parts in a shield gas atmosphere using continuously supplied metal wire filler material, comprising:

a filler metal support section formed with an axially aligned hole for supplying metal wire filler material;

a cylindrical nozzle which is disposed around and is separated from said filler metal support section defining an annular passage therebetween;

a fluid passage adaptor connected to said nozzle having an aperture open to said annular passage;

a shield gas supply section coupled to said cylindrical nozzle for selectively supplying shield gas into said annular passage in said nozzle, and a fluid supply section for the purpose of supplying fluid into said annular passage for removal of sputter, wherein said fluid supply section is configured to selectively supply fluid into at least one of said axially aligned hole and said fluid passage adaptor at a flow rate of at least 3000 liters/minute.

19. A gas-shielded arc welding machine and torch as in claim 18, wherein said fluid supply section supplies fluid for removal of sputter at a flow rate of at least 5000 liters/minute.

20. A gas-shielded arc welding machine torch as in claim 18, wherein said fluid supply section supplies fluid for removal of sputter at a flow rate in a range 7000–9000 liters/minute.

21. A torch for a gas-shielded arc welding machine which effects arc welding in a shield gas atmosphere using continuously supplied metal wire filler material, comprising:

a gas-shielded arc welding machine torch having a tip element formed with an axially extending hole for supplying and supporting metal wire filler material;

a cylindrical insulating element fixed to the base portion of said tip element;

a nozzle having a cylindrical nozzle main body disposed around and separated from said filler metal support section defining and annular passage therebetween, said main body having an inner peripheral surface in contact with a front-end outer peripheral surface of said insulating element, said nozzle further having a fluid passage section fixed to an outer side of said nozzle main body, a fixing element which couples said insulating element and said nozzle main body, and a shield gas supply section for the purpose of supplying shield gas into said nozzle.

22. A torch for a gas-shielded arc welding machine as in claim 21, wherein said fixing element is a tubular-shaped element formed with an engagement portion having a threaded inner peripheral surface which engages said filler metal support section, and an outer peripheral surface of a base end of said nozzle main body being formed with threads which are in screw-engagement with said fixing element's threads.

23. A torch for a gas-shielded arc welding machine as in claim 22, wherein said main body inner peripheral surface being tapered and said front-end outer peripheral surface of said insulating element being tapered such that the diameter of both surfaces becomes smaller extending towards a welding end of the torch.

24. A torch for a gas-shielded arc welding machine as in claim 23, wherein a first bevelled portion is formed at a base portion end of said front-end outer peripheral surface of said insulating element, and a second bevelled portion contactable with said first bevelled portion is formed at a base portion end of said nozzle main body.

25. A torch for a gas-shielded arc welding machine which effects arc welding of parts in a shield gas atmosphere using continuously supplied metal wire filler material, the torch comprising:

a filler metal support section formed with a hole that extends throughout said filler metal support section for supplying and supporting a metal wire filler material;

a cylindrical nozzle disposed around and spaced apart from said filler metal support section defining an annular passage therebetween;

a fluid passage mounted on an outer surface of said cylindrical nozzle which communicates with said annular passage;

a fluid supply means for selectively supplying compressed air to said annular passage for removal of sputter;

a shield gas supply section for selectively supplying shield gas to said fluid passage during welding; and wherein a part of said hole is larger than the diameter of said metal wire filler material and said filler metal support section is formed with an aperture between said hole and said annular passage, and said shield gas supply section selectively supplies shield gas to said hole in said filler metal support section.

* * * * *